US012659845B2

(12) United States Patent
Goyal et al.

(10) Patent No.: US 12,659,845 B2
(45) Date of Patent: Jun. 16, 2026

(54) CELL SELECTION FOR USER EQUIPMENT REGISTRATION

(71) Applicant: QUALCOMM Incorporated, San Diego, CA (US)

(72) Inventors: Hari Om Goyal, Hyderabad (IN); Priyangshu Ghosh, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 18/052,831

(22) Filed: Nov. 4, 2022

(65) Prior Publication Data

US 2024/0155481 A1 May 9, 2024

(51) Int. Cl.

| | |
|---|---|
| ***H04W 48/20*** | (2009.01) |
| ***H04W 48/16*** | (2009.01) |
| ***H04W 60/04*** | (2009.01) |
| ***H04W 72/542*** | (2023.01) |
| ***H04W 76/19*** | (2018.01) |

(52) U.S. Cl.

CPC ........... *H04W 48/20* (2013.01); *H04W 48/16* (2013.01); *H04W 60/04* (2013.01); *H04W 72/542* (2023.01); *H04W 76/19* (2018.02)

(58) Field of Classification Search

CPC ..... H04W 48/20; H04W 48/16; H04W 60/04; H04W 72/542; H04W 76/19; H04W 48/18; H04W 60/00

See application file for complete search history.

(56) References Cited

U.S. PATENT DOCUMENTS

| | | | | |
|---|---|---|---|---|
| 2010/0255838 | A1* | 10/2010 | Wu | H04W 48/08 455/434 |
| 2016/0255674 | A1* | 9/2016 | Niemi | H04W 60/04 455/435.1 |
| 2016/0353342 | A1* | 12/2016 | Futaki | H04W 36/16 |
| 2019/0306787 | A1 | 10/2019 | Pasupuleti et al. | |
| 2021/0185589 | A1* | 6/2021 | Telang | H04W 60/04 |
| 2023/0337166 | A1* | 10/2023 | Wang | H04W 60/04 |
| 2025/0150943 | A1* | 5/2025 | Koskela | H04W 36/0061 |

FOREIGN PATENT DOCUMENTS

WO 2020113530 A1 6/2020

OTHER PUBLICATIONS

International Search Report and Written Opinion—PCT/US2023/076515—ISA/EPO—Jan. 23, 2024.

* cited by examiner

*Primary Examiner* — Mazda Sabouri
(74) *Attorney, Agent, or Firm* — QUALCOMM Incorporated

(57) ABSTRACT

A user equipment (UE) may be configured to select the cell in which the UE performs a non-access stratum (NAS) procedure for UE registration, for example, based on a number of failed attempts of the NAS procedure for UE registration. The UE may be configured to determine that an NAS procedure associated with UE registration is unsuccessful in a first cell. The UE may be further configured to reattempt the NAS procedure in a second cell based on a determination that the NAS procedure is unsuccessful in the first cell.

27 Claims, 8 Drawing Sheets

300
One Frame (TDD)
10 ms
subframe
slot
RB
OFDM symbol
subcarrier
DMRS $R_x$
CSI-RS 330
PDCCH
SSS
PSS
PDSCH
PBCH
SS/PBCH Block
BWP
20 RBs
channel bandwidth RBs

350
SRS
DMRS R

380
PUCCH
PUSCH
SRS Comb 0
SRS Comb 1

700

702

Transmit, in a first cell, a registration request associated with an NAS procedure for UE registration

704

Receive an RRC message indicating a connection release before the NAS procedure is successfully completed in the first cell

706

Adjust a value of a counter associated with the first cell based on the RRC message indicating connection release

708

Unsuccessful NAS procedure count ≥ threshold?

no yes

710

Determine that the NAS procedure associated with UE registration is unsuccessful in the first cell

712

Reprioritize a set of cells on which to camp based on determining that the NAS procedure is unsuccessful in the first cell – the first cell being reprioritized to be below a second cell

714

Reattempt the NAS procedure in the second cell based on determining that the NAS procedure is unsuccessful in the first cell

716

Receive a registration accept message in the second cell based on the registration request message – the NAS procedure being successfully completed in the second cell based on the registration accept message

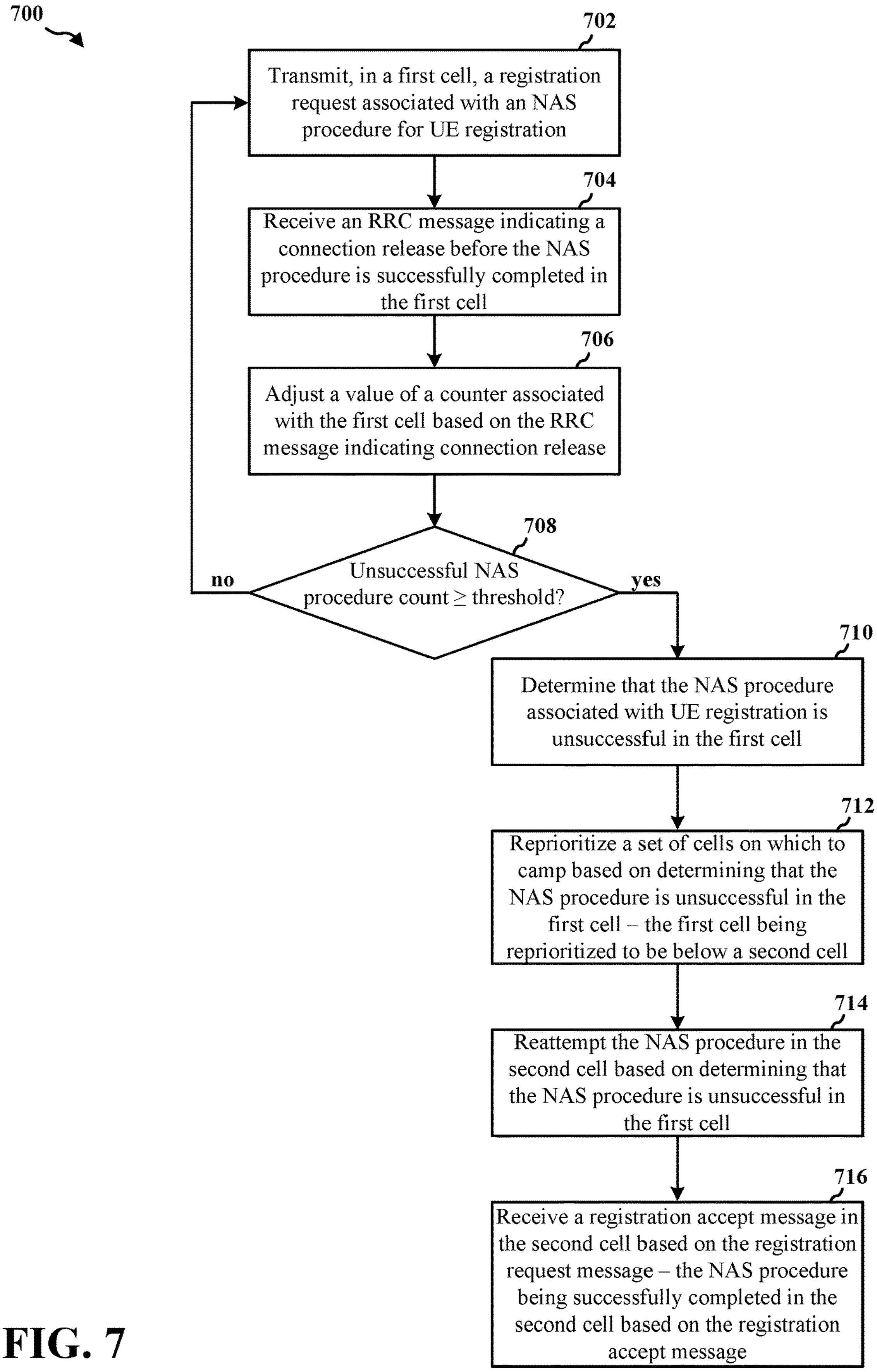

FIG. 7

CELL SELECTION FOR USER EQUIPMENT REGISTRATION

BACKGROUND

Technical Field

The present disclosure generally relates to communication systems, and more particularly, to a user equipment (UE) configured to select another cell in which to reattempt a registration procedure for the UE when the registration procedure is unsuccessful in one cell.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may be configured to select the cell in which the UE performs a non-access stratum (NAS) procedure for UE registration, for example, based on a number of failed attempts of the NAS procedure for UE registration.

In an aspect of the disclosure, a method, a computer-readable medium, and an apparatus are provided. The apparatus may be a UE or a component thereof. The apparatus may be configured to determine that an NAS procedure associated with UE registration is unsuccessful in a first cell. The apparatus may be further configured to reattempt the NAS procedure in a second cell based on a determination that the NAS procedure is unsuccessful in the first cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flowchart illustrating an example of a method of wireless communication at a UE, in accordance with various aspects of the present disclosure.

DETAILED DESCRIPTION

Figure 1:
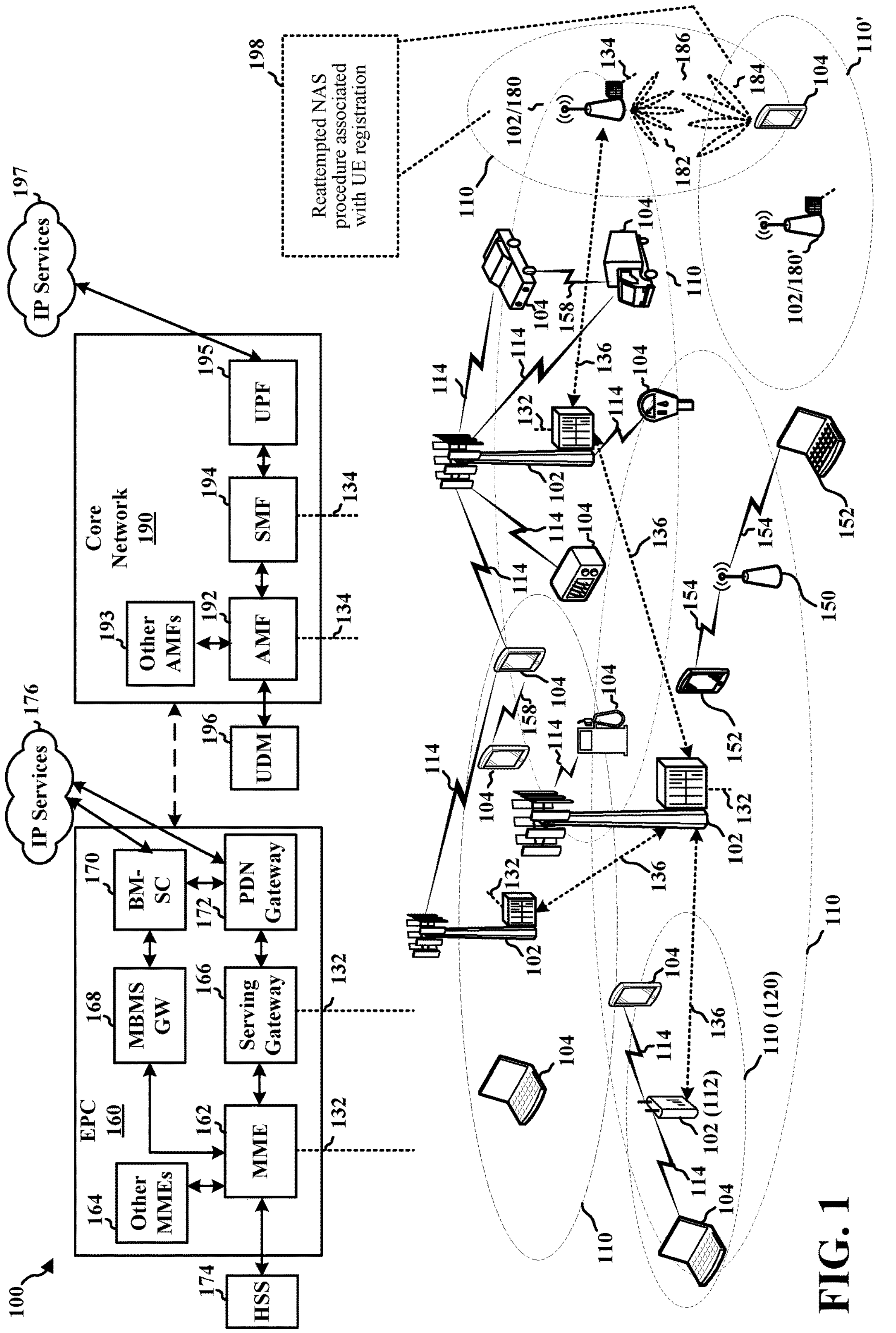
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, the concepts and related aspects described in the present disclosure may be implemented in the absence of some or all of such specific details. In some instances, well-known structures, components, and the like are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells, such as high power cellular base stations, and/or small cells, such as low power cellular base stations (including femtocells, picocells, and microcells).

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as the Next Generation Radio Access Network (RAN) (NG-RAN), may interface with a core network 190 through second backhaul links 134. In addition to other functions, the base stations 102 may perform one or more of: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 136 (e.g., X2 interface). The first backhaul links 132, the second backhaul links 134, and the third backhaul links 136 may be wired, wireless, or some combination thereof. At least some of the base stations 102 may be configured for integrated access and backhaul (IAB). Accordingly, such base stations may wirelessly communicate with other base stations, which also may be configured for IAB.

At least some of the base stations 102 configured for IAB may have a split architecture including multiple units, some or all of which may be collocated or distributed and which may communicate with one another. For example, FIG. 2, infra, illustrates an example disaggregated base station 200 architecture that includes at least one of a central unit (CU) 210, a distributed unit (DU) 230, a radio unit (RU) 240, a remote radio head (RRH), a remote unit, and/or another similar unit configured to implement one or more layers of a radio protocol stack.

The base stations 102 may wirelessly communicate with the UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.).

A UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Each of the base stations 102 may provide communication coverage for a respective geographic coverage area 110, which may also be referred to as a "cell." Potentially, two or more geographic coverage areas 110 may at least partially overlap with one another, or one of the geographic coverage areas 110 may contain another of the geographic coverage areas. For example, the small cell 112 may have a coverage area 120 that overlaps with the coverage area 110 of one or more macro base stations 102. A network that includes both small cells and macrocells may be known as a heterogeneous network. A heterogeneous network may also include Home Evolved Node Bs (eNBs) (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use multiple-input and multiple-output (MIMO) antenna technology, including spatial multiplexing, beamforming, and/or transmit diversity. Wireless links or radio links may be on one or more carriers, or component carriers (CCs). The base stations 102 and/or UEs 104 may use spectrum up to Y megahertz (MHz) (e.g., Y may be equal to or approximately equal to 5, 10, 15, 20, 100, 400, etc.) bandwidth per carrier allocated in a carrier aggregation of up to a total of Yx MHz (e.g., x CCs) used for transmission in each direction. The CCs may or may not be adjacent to each other. Allocation of CCs may be asymmetric with respect to downlink and uplink (e.g., more or fewer CCs may be allocated for downlink than for uplink).

The CCs may include a primary CC and one or more secondary CCs. A primary CC may be referred to as a primary cell (PCell) and each secondary CC may be referred to as a secondary cell (SCell). The PCell may also be referred to as a "serving cell" when the UE is known both to a base station at the access network level and to at least one core network entity (e.g., AMF and/or MME) at the core network level, and the UE may be configured to receive downlink control information in the access network (e.g., the UE may be in an RRC Connected state). In some instances in which carrier aggregation is configured for the UE, each of the PCell and the one or more SCells may be a serving cell.

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 112 may operate in a licensed and/or an unlicensed frequency spectrum. When operating in an unlicensed frequency spectrum, the small cell 112 may employ NR and use the same unlicensed frequency spectrum (e.g., 5 GHz or the like) as used by the Wi-Fi AP 150. The small cell 112, employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band. In some aspects, "mmW" or "near-mmW" may additionally or alternatively refer to a 60 GHz frequency range, which may include multiple channels outside of 60 GHz. For example, a 60 GHz frequency band may refer to a set of channels spanning from 57.24 GHz to 70.2 GHz.

In view of the foregoing, unless specifically stated otherwise, the term "sub-6 GHz," "sub-7 GHz," and the like, to the extent used herein, may broadly represent frequencies that may be less than 6 GHz, frequencies that may be less than 7 GHz, frequencies that may be within FR1, and/or frequencies that may include mid-band frequencies. Further, unless specifically stated otherwise, the term "millimeter wave" and other similar references, to the extent used herein, may broadly represent frequencies that may include mid-band frequencies, frequencies that may be within FR2, and/or frequencies that may be within the EHF band.

A base station 102 may be implemented as a macro base station providing a large cell or may be implemented as a small cell 112 having a small cell coverage area. Some base stations 102 may operate in a traditional sub-6 GHz (or sub-7 GHz) spectrum, in mmW frequencies, and/or near-mmW frequencies in communication with the UE 104. When such a base station operates in mmW or near-mmW frequencies, the base station may be referred to as a mmW base station 180. The mmW base station 180 may utilize beamforming 186 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182. The UE 104 may receive the beamformed signal from the base station 180 in one or more receive directions 184. The UE 104 may also transmit a beamformed signal to the base station 180 in one or more transmit directions. The base station 180 may receive the beamformed signal from the UE 104 in one or more receive directions. One or both of the base station 180 and/or the UE 104 may perform beam training to determine the best receive and/or transmit directions for the one or both of the base station 180 and/or UE 104. The transmit and receive directions for the base station 180 may or may not be the same. The transmit and receive directions for the UE 104 may or may not be the same.

In various different aspects, one or more of the base stations 102/180 may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology.

In some aspects, one or more of the base stations 102/180 may be connected to the EPC 160 and may provide respective access points to the EPC 160 for one or more of the UEs 104. The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, with the Serving Gateway 166 being connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

In some other aspects, one or more of the base stations 102/180 may be connected to the core network 190 and may provide respective access points to the core network 190 for one or more of the UEs 104. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

In certain aspects, the UE 104 may be configured to attempt an NAS procedure associated with UE registration in a first cell 110' provided by a first base station 102/180'. However, the attempted NAS procedure may fail, e.g., due to loss of synchronization between the first base station 102/180' and the AMF 134.

The UE 104 may be further configured to determine that the NAS procedure associated with UE registration is unsuccessful in the first cell 110'. Based on such a determination, the UE 104 may select a second cell 110 provided by a second base station 102/180. The UE 104 may reattempt the NAS procedure associated with UE registration (198) in the second cell 110 based on determining that the NAS procedure is unsuccessful in the first cell 110'.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

Figure 2:
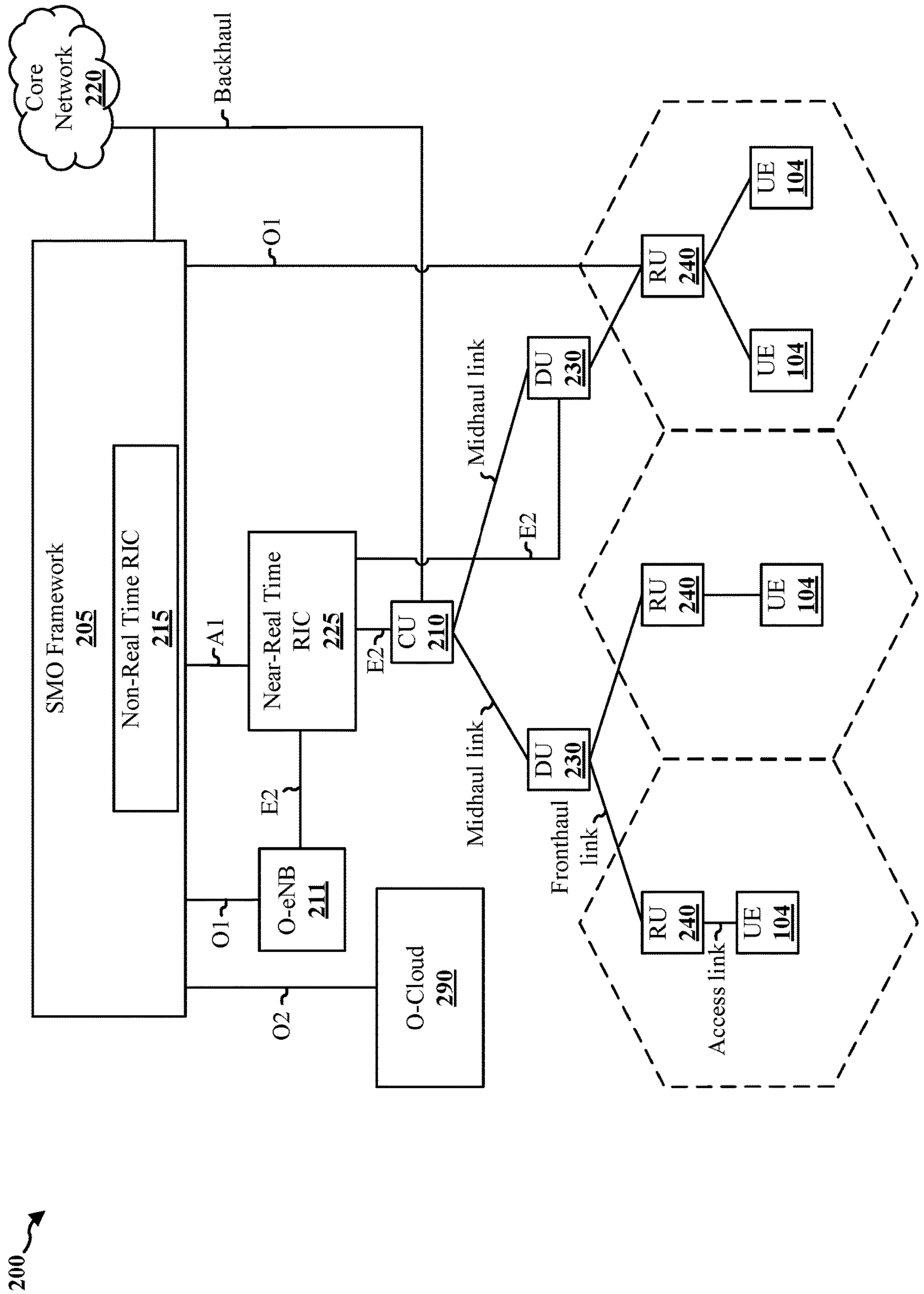
FIG. 2 is a diagram illustrating an example disaggregated base station architecture, in accordance with various aspects of the present disclosure.

FIG. 2 shows a diagram illustrating an example disaggregated base station 200 architecture. Deployment of communication systems, such as 5G NR systems, may be arranged in multiple manners with various components or constituent parts. In a 5G NR system, or network, a network node, a network entity, a mobility element of a network, a RAN) node, a core network node, a network element, or a network equipment, such as a base station, or one or more units (or one or more components) performing base station functionality, may be implemented in an aggregated or disaggregated architecture. For example, a base station may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 200 architecture may include one or more CUs 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more DUs 230 via respective midhaul links, such as an F1 interface. The DUs 230 may communicate with one or more RUs 240 via respective fronthaul links. The RUs 240 may communicate with respective UEs 104 via one or more radio frequency (RF) access links. In some implementations, the UE 104 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figures 3A, 3B, 3C, 3D:
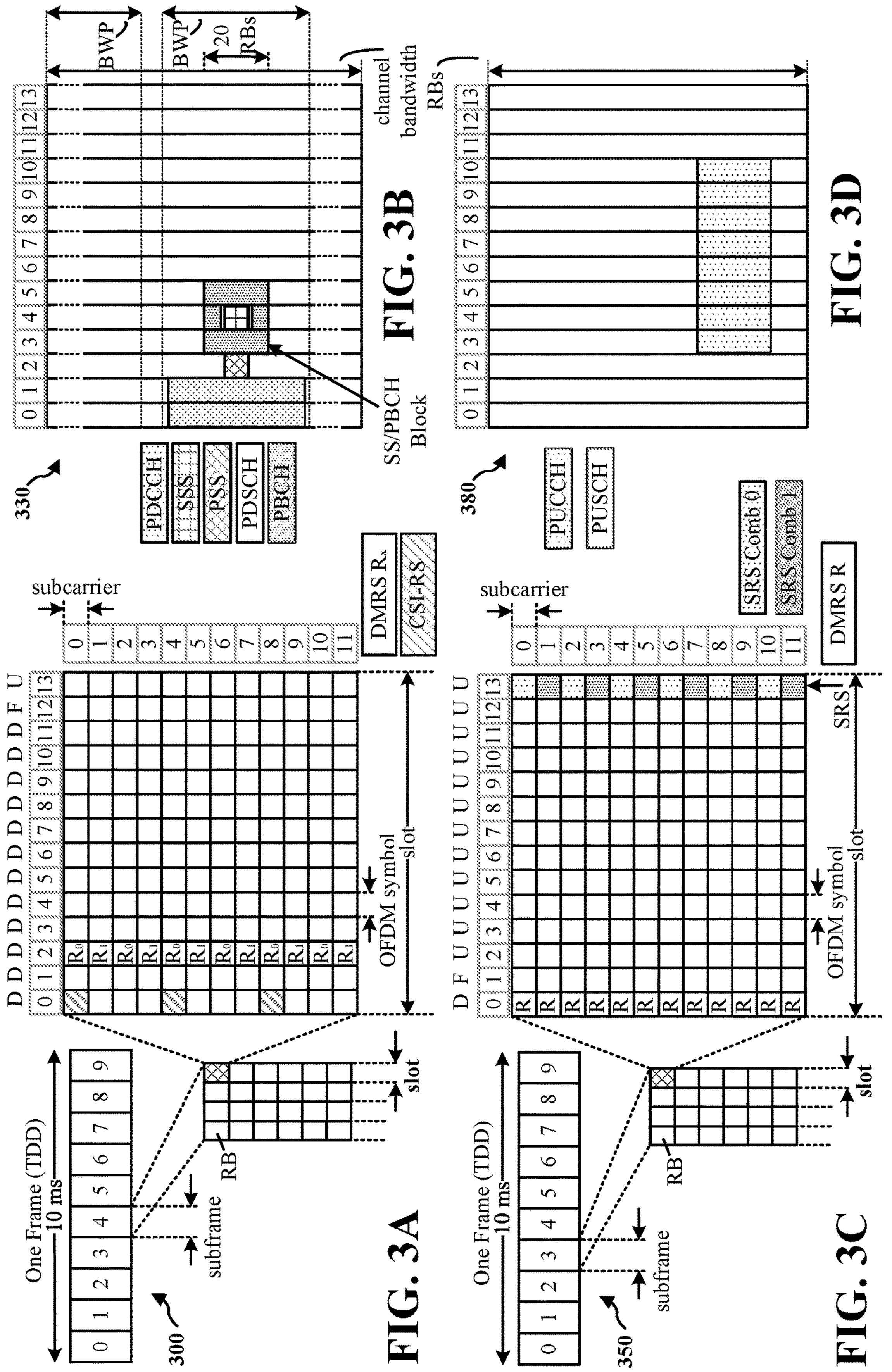
FIG. 3A is a diagram illustrating an example of a first frame, in accordance with various aspects of the present disclosure.
FIG. 3B is a diagram illustrating an example of downlink channels within a subframe, in accordance with various aspects of the present disclosure.
FIG. 3C is a diagram illustrating an example of a second frame, in accordance with various aspects of the present disclosure.
FIG. 3D is a diagram illustrating an example of uplink channels within a subframe, in accordance with various aspects of the present disclosure.

FIG. 3A is a diagram illustrating an example of a first subframe 300 within a 5G NR frame structure. FIG. 3B is a diagram illustrating an example of downlink channels within a 5G NR subframe 330. FIG. 3C is a diagram illustrating an example of a second subframe 350 within a 5G NR frame structure. FIG. 3D is a diagram illustrating an example of uplink channels within a 5G NR subframe 380. The 5G NR frame structure may be frequency division duplexed (FDD) in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 3A and 3C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to 2μ*15 kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 3B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry at least one pilot signal, such as a reference signal (RS), for the UE. Broadly, RSs may be used for beam training and management, tracking and positioning, channel estimation, and/or other such purposes. In some configurations, an RS may include at least one demodulation RS (DM-RS) (indicated as $R_x$ for one particular configuration, where 100× is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 3B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. A UE (such as a UE 104 of FIG. 1) may use the PSS to determine subframe/symbol timing and a physical layer identity. A secondary synchronization signal (SSS) may be within symbol 4 of particular subframes of a frame. A UE (such as a UE 104 of FIG. 1) may use the SSS to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 3D illustrates an example of various uplink channels within a subframe of a frame. The PUCCH may be located as indicated in one configuration. The PUCCH carries uplink control information (UCI), which may include a scheduling request (SR), a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 4:
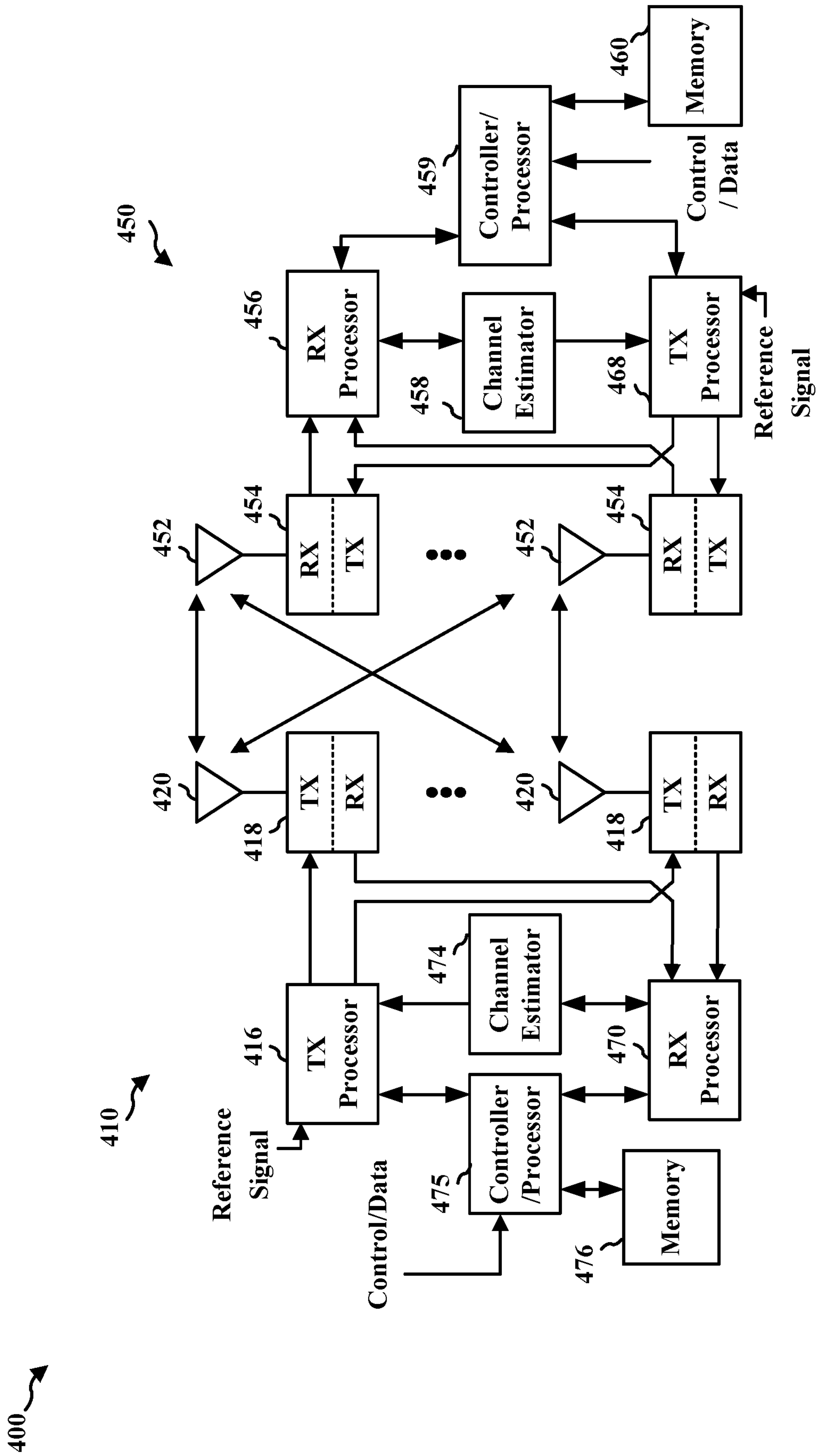
FIG. 4 is a diagram illustrating an example of a base station and user equipment (UE) in an access network, in accordance with various aspects of the present disclosure.

FIG. 4 is a block diagram of a base station 410 in communication with a UE 450 in an access network 400. In the downlink, IP packets from the EPC 160 may be provided to a controller/processor 475. The controller/processor 475 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 475 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 416 and the receive (RX) processor 470 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream may then be provided to a different antenna 420 via a separate transmitter 418TX. Each transmitter 418TX may modulate a radio frequency (RF) carrier with a respective spatial stream for transmission. At the UE 450, each receiver 454RX receives a signal through at least one respective antenna 452. Each receiver 454RX recovers information modulated onto an RF carrier and provides the information to the receive (RX) processor 456. The TX processor 468 and the RX processor 456 implement L1 functionality associated with various signal processing functions. The RX processor 456 may perform spatial processing on the information to recover any spatial streams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459, which implements L3 and L2 functionality.

The controller/processor 459 can be associated with a memory 460 that stores program codes and data. The memory 460 may be referred to as a computer-readable medium. In the uplink, the controller/processor 459 provides demultiplexing between transport and logical channels, packet reassembly, deciphering, header decompression, and control signal processing to recover IP packets from the EPC 160. The controller/processor 459 is also responsible for error detection using an ACK and/or NACK protocol to support HARQ operations.

Similar to the functionality described in connection with the downlink transmission by the base station 410, the controller/processor 459 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

The uplink transmission is processed at the base station 410 in a manner similar to that described in connection with the receiver function at the UE 450. Each receiver 418RX receives a signal through at least one respective antenna 420. Each receiver 418RX recovers information modulated onto an RF carrier and provides the information to a RX processor 470.

The controller/processor 475 can be associated with a memory 476 that stores program codes and data. The memory 476 may be referred to as a computer-readable medium. In the uplink, the controller/processor 475 provides demultiplexing between transport and logical channels, packet reassembly, deciphering, header decompression, control signal processing to recover IP packets from the UE 450. IP packets from the controller/processor 475 may be provided to the EPC 160. The controller/processor 475 is also responsible for error detection using an ACK and/or NACK protocol to support HARQ operations.

At least one of the TX processor 468, the RX processor 456, and the controller/processor 459 may be configured to perform aspects in connection with the reattempted NAS procedure associated with UE registration (198) of FIG. 1.

Figure 5:
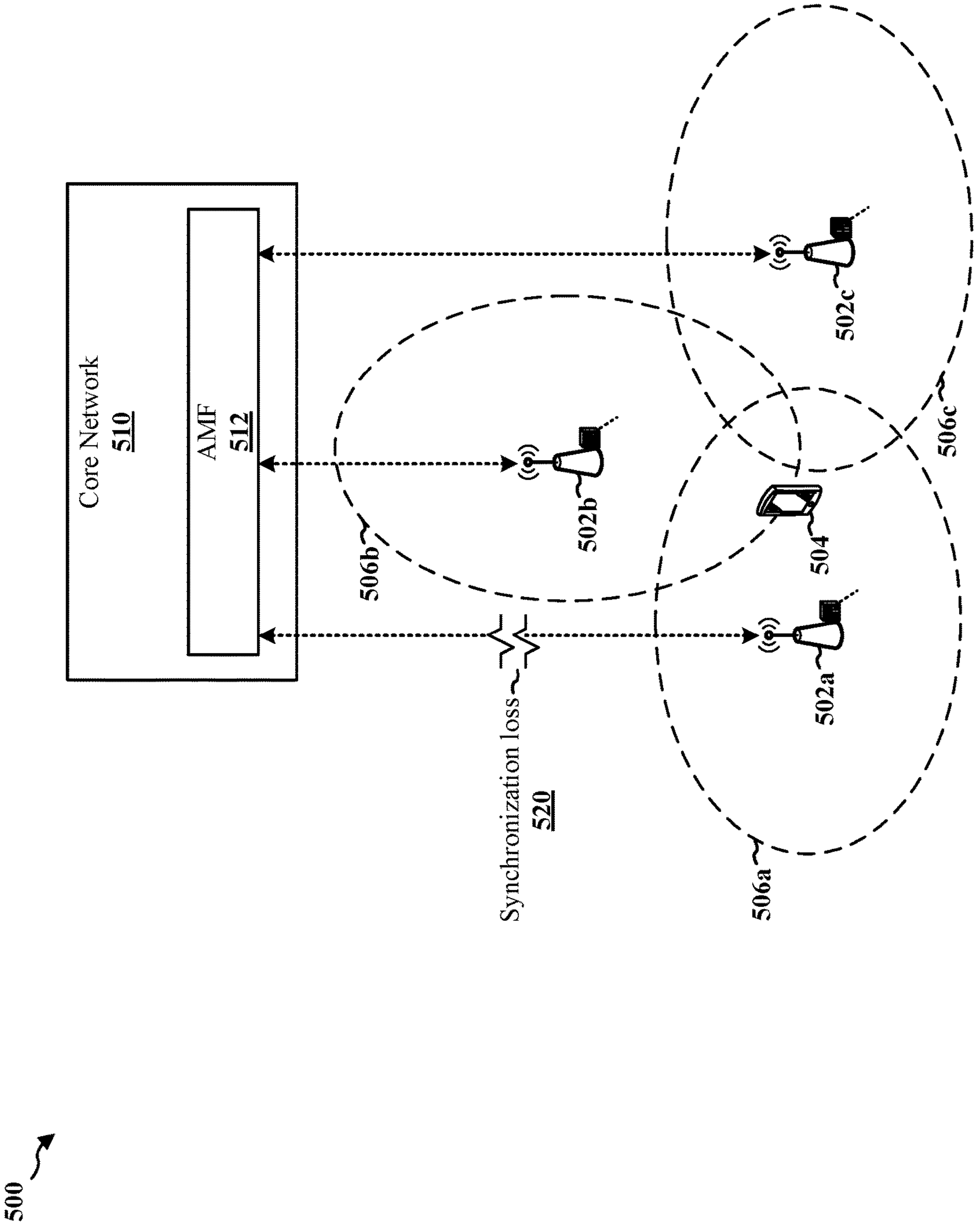
FIG. 5 is a diagram illustrating an example of a wireless communication system, in accordance with various aspects of the present disclosure.

FIG. 5 is a diagram illustrating an example of a wireless communication system 500, in accordance with various aspects of the present disclosure. For initial access (such as when a UE 504 is powered on) or UE mobility (such as when the UE 504 moves outside of a registration area or tracking area), the UE 504 may be configured to perform an NAS procedure for UE registration. For example, the UE 504 may camp on a first cell 506*a* provided by a first base station 502*a*.

The UE 504 may select the first cell 506*a* to camp on over the second and third cells 506*b*, 506*c* based on one or more channel metrics determined for each of the cells 506*a*-506*c*. The UE 504 may receive pilot signals from each of the network entities 502*a*-502*c*, and the UE 504 may measure the energy with which pilot signals are received in each of the cells 506*a*-506*c*—e.g., the UE 504 may measure a reference signal receive power (RSRP), a signal-to-noise ratio (SNR), a signal-to-interference-plus-noise ratio (SINR), or another similar channel metric. The UE 504 may determine to camp on the cell (e.g., the first cell 506*a*) having the best or highest measured energy relative to the other cells 506*b*-506*c*. Further, the UE 504 may transmit a registration request message in order to initiate the NAS procedure for UE registration (e.g., so that the UE can be paged in a group of cells).

The UE 504 may expect a registration accept message from the first base station 502*a* in response to the registration request. However, an error may occur at the network side preventing such a registration accept message from being transmitted to the UE 504. For example, as the registration procedure is handled on the network side in a highly modularized manner, the first base station 502*a* and one or more components of the core network 510, such as an AMF 512, may experience a synchronization loss 520 that mistakenly results in an RRC connection release of the UE 504. In such an instance, the RRC connection of the UE 504 may be released before the UE receives a registration accept message.

In some conventional systems, a UE may retry the NAS procedure for UE registration after the RRC connection release. However, such a UE may acquire and latch onto the same first cell 506*a*—e.g., same absolute radio-frequency channel number (ARFCN) and same PCI—because the channel metrics measured from signals received from the first base station 502*a* remain preferable to (e.g., higher or better than) those of the second and third base stations 502*b*, 502*c*. However, as long as the network-side error is not resolved, the UE will continue to experience unsuccessful NAS procedures for UE registration, which may result in a reduction in the quality of user experience and/or delay in UE registration.

According to various aspects of the present disclosure, the UE 504 may be configured to move the current cell (e.g., the first cell 506*a*) to a lower priority or "bad" cell list upon reaching a threshold number of reattempted and unsuccessful NAS procedures for UE registration. The UE 504 may refrain from attempting the NAS procedure for UE registration with the cells included in the lower priority or bad cell list.

According to some configurations, however, the UE 504 may move a cell from the lower priority or bad cell list to a higher priority or "good" (or "untested") cell list. For example, the UE 504 may move the first cell 506*a* from the lower priority or bad cell list to the higher priority or good cell list after a specific time period has elapsed (e.g., cells may remain on the lower priority or bad cell list while a timer is running), or after a public land mobile network (PLMN) change. Once the first cell 506*a* is moved off the lower priority or bad cell list, the UE 504 may be free to attempt the NAS procedure for UE registration in the first cell 506*a*, e.g., if the channel metrics associated with the first cell 506*a* are preferable to those of the second and third cells 506*b*, 506*c*.

Figure 6:
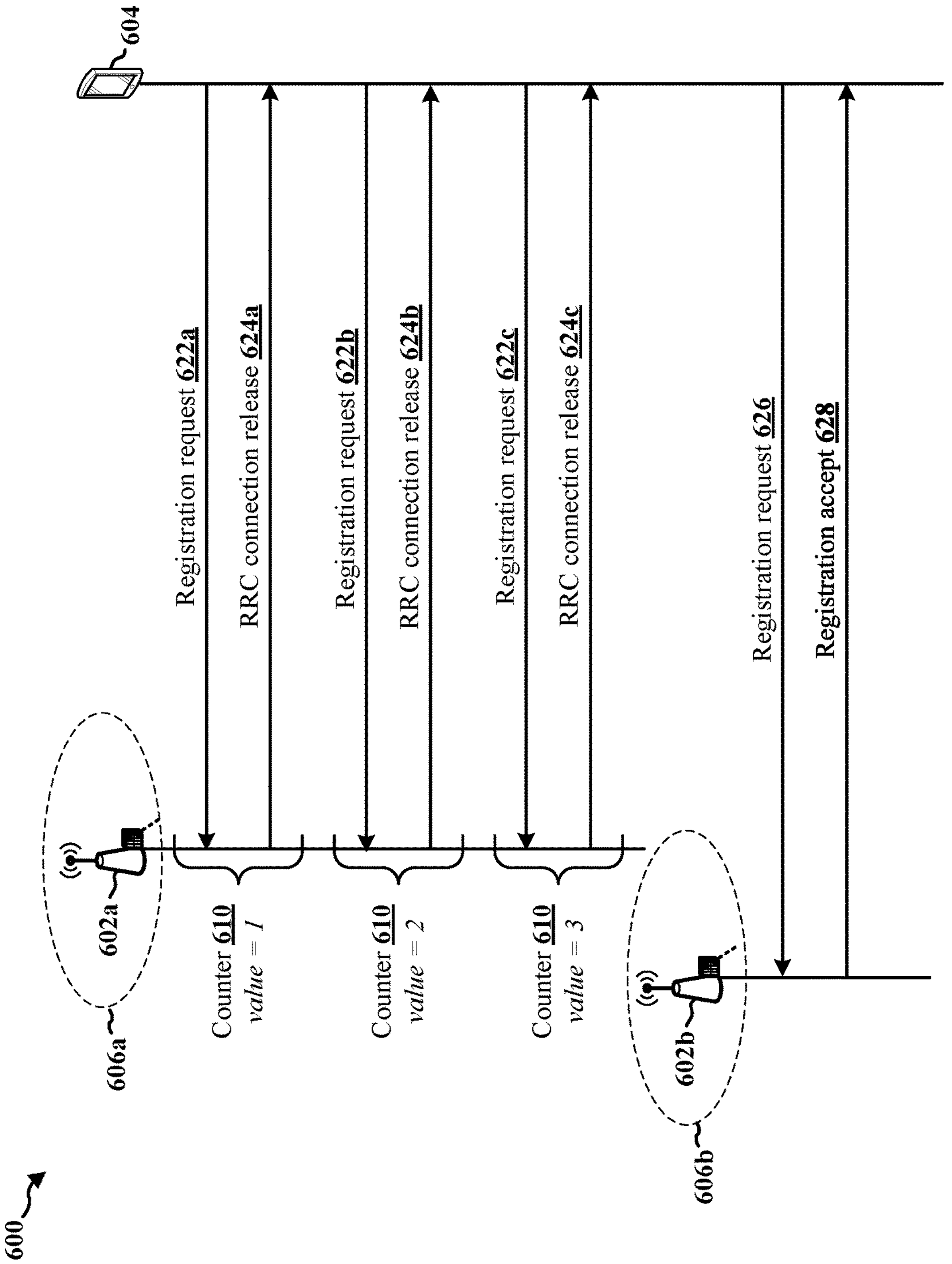
FIG. 6 is a call flow diagram illustrating an example communication flow for a registration procedure.

FIG. 6 is a call flow diagram illustrating an example communication flow 600 for a registration procedure. The UE 604 may transmit, in a first cell 606*a* provided by a first base station 602*a*, a first registration request 622*a* associated with an NAS procedure for UE registration. The first registration request 622*a* may indicate an ARFCN and a PCI associated with the first cell 606*a*. Due to a network-side error, the RRC connection with the UE 604 may be released, and the UE 604 may receive an RRC connection release message 624*a* before the NAS procedure is successfully completed in the first cell 606*a*.

Based on the RRC connection release message 624*a*, the UE 604 may adjust a value of a counter 610 associated with the first cell 606*a*. For example, the UE 604 may increment the counter 610, e.g., from 0 to 1. The counter 610 may reflect the number of unsuccessful NAS procedures for UE registration in the first cell 606*a*.

In some aspects, the UE 604 may determine whether the value of the counter 610 (at this point, 1) satisfies (e.g., is greater than or equal to) a threshold (e.g., the threshold may be equal to 3 in this example, but other threshold values are possible). That is, the UE 604 may compare the value of the counter 610 with the threshold.

If the value of the counter 610 fails to satisfy (e.g., is less than) the threshold, the UE 604 may retry the NAS procedure for UE registration in the first cell 606*a*. Accordingly, the UE 604 may retransmit, in the first cell 606*a* provided by the first base station 602*a*, a registration request 622*b* associated with the NAS procedure for UE registration. In some aspects, the second registration request 622*b* may indicate the same ARFCN and PCI associated with the first cell 606*a*. However, the RRC connection with the UE 604 may be released before the UE 604 receives a registration accept message, e.g., because the network-side error may remain unresolved. Consequently, the UE 604 may receive another RRC connection release message 624*b* preventing the NAS procedure from being successfully completed in the first cell 606*a*.

The UE 604 may again adjust the value of the counter 610 based on the RRC connection release message 624*b*. For example, the UE 604 may increment the counter 610, e.g., from 1 to 2. The UE 604 may compare the value of the counter (here, 2) with the threshold (e.g., 3), and determine that the threshold number of reattempted NAS procedures for UE registration has not yet been reached because the value of the counter remains less than the threshold.

Accordingly, the UE 604 may again retry the NAS procedure for UE registration in the first cell 606*a*. Accordingly, the UE 604 may retransmit, in the first cell 606*a*, another registration request 622*c* associated with the NAS procedure for UE registration. In some aspects, the third registration request 622*c* may indicate the same ARFCN and PCI associated with the first cell 606*a*. Due to some error, such as an unresolved synchronization error between the first base station 602*a* and an AMF, the RRC connection with the UE 604 may again be released before the UE 604 receives a registration accept message. Thus, the UE 604 may receive another RRC connection release message 624*c* indicating the termination of the NAS procedure before the NAS procedure could be successfully completed in the first cell 606*a*.

The UE 604 may again adjust the value of the counter 610 based on the RRC connection release message 624*c*. For example, the UE 604 may increment the counter 610, e.g., from 2 to 3. The UE 604 may compare the value of the counter (here, 3) with the threshold (e.g., 3), and the UE 604 may determine that the value of the counter satisfies (e.g., is greater than or equal to) the threshold. As the threshold number of reattempted NAS procedures for UE registration has been reached in the first cell 606*a*, the UE 604 may determine that the NAS procedure associated with UE registration is unsuccessful in the first cell 606*a*.

Upon determining that the NAS procedure associated with UE registration is unsuccessful in the first cell 606*a*, the UE 604 may reprioritize a set of cells on which to camp. For example, the UE 604 may reprioritize the first cell 606*a* to have a priority that is relatively lower than the priority of a second cell 606*b*. In some aspects, the UE 604 may reassign the first cell 606*a* from a set of preferred cells available for the NAS procedure associated with UE registration to a set of non-preferred cells available for the NAS procedure associated with UE registration.

Another cell, e.g., a second cell 606*b* having a coverage area that the UE 604 is within, may be included in the set of preferred cells available for the NAS procedure. In some aspects, the first cell 606*a* and the second cell 606*b* are associated with at least one of a same registration area, a same tracking area, a same coverage area, or a same ARFCN; however, the first cell 606*a* and the second cell 606*b* have different PCIs. In some aspects, a first channel metric that is based on measurements in the first cell 606*a* is greater than a second channel metric that is based on measurements in the second cell 606*b*; however, the UE 604 may select the second cell 606*b*, and not the first cell 606*a*, in which to reattempt the NAS procedure for UE registration due to the number of unsuccessful attempts at the NAS procedure in the first cell 606*a*.

The UE 604 may reattempt the NAS procedure in the second cell 606*b* by transmitting a registration request 626 intended for the second cell 606*b* to the second base station 602*b*. In some aspects, the registration request 626 in the second cell 606*b* may indicate the same ARFCN but a different PCI than the registration requests 622*a*-622*c* transmitted in the first cell 606*a*. The UE 604 may refrain from reattempting the NAS procedure in the first cell 606*a* until at least one of a time period has elapsed or a change to a public land mobile network (PLMN) is detected, and the UE 604 may reattempt the NAS procedure in the second cell 606*b* during the time period.

The second base station 602*b* may not be experiencing the same issues at the first base station 602*a*, which may allow a successful NAS procedure for UE registration to be completed. Accordingly, the UE 604 may receive a registration accept message 628 in the second cell 606*b* based on the registration request 626 transmitted in the second cell 606*b*. The NAS procedure may be successfully completed in the second cell 606*b* based on the registration accept message 628.

FIG. 7 is a flowchart of a method 700 of wireless communication. The method 700 may be performed by or at a UE (e.g., the UE 104, 450, 504, 604), another wireless communications apparatus (e.g., the apparatus 802), or one or more components thereof. According to various different aspects, one or more of the illustrated blocks may be omitted, transposed, and/or contemporaneously performed.

At 702, the UE may be configured to transmit, in a first cell, a registration request associated with an NAS procedure for UE registration. In the context of FIG. 6, for example, the UE 604 may transmit the one of the registration requests 622*a*-622*c* to the first base station 602*a* providing a first cell.

At 704, the UE may receive an RRC message indicating a connection release before the NAS procedure is successfully completed in the first cell. In the context of FIG. 6, for example, the UE 604 may receive one of the RRC connection release messages 624*a*-624*c* from the first base station 602*a* providing the first cell.

At 706, the UE may adjust a value of a counter associated with the first cell based on the RRC message indicating the connection release. In the context of FIG. 6, for example, the UE 604 adjust the value of the counter 610 associated with the first cell provided by the first base station 602*a* based on receiving one of the RRC connection release messages 624*a*-624*c*.

At 708, the UE may determine whether the unsuccessful NAS procedure count satisfies (e.g., is greater than or equal to) a threshold. For example, the UE may compare the value of a counter that is incremented each time an RRC connection release message is received in response to a registration request with a threshold value. In the context of FIG. 6, for example, the UE 604 may determine whether the value of the counter 610 satisfies (e.g., is greater than or equal to) a threshold.

If the unsuccessful NAS procedure count fails to satisfy (e.g., is less than) the threshold, the UE may retry the NAS procedure for UE registration in the first cell, e.g., by returning to 702, supra.

At 710, if the unsuccessful NAS procedure count satisfies (e.g., is greater than or equal to) the threshold, the UE may determine that the NAS procedure associated with UE registration is unsuccessful in the first cell. In the context of FIG. 6, for example, the UE 604 may determine that the NAS procedure associated with UE registration is unsuccessful in the first cell provided by the first base station 602*a*.

At 712, the UE may reprioritize a set of cells on which to camp based on determining that the NAS procedure is unsuccessful in the first cell. In so doing, the UE may reprioritize the first cell to have a priority that is relatively lower than the priority of a second cell. For example, the UE may reassign the first cell from a set of preferred cells available for the NAS procedure associated with UE registration to a set of non-preferred cells available for the NAS procedure associated with UE registration; however, the second cell may be included in the set of preferred cells available for the NAS procedure. In some aspects, the first cell and the second cell are associated with at least one of a same registration area, a same tracking area, a same coverage area, or a same ARFCN, and the first cell and the second cell have different PCIs. In some aspects, a first channel metric that is based on measurements in the first cell is greater than a second channel metric that is based on measurements in the second cell.

In the context of FIG. 6, for example, the UE 604 may reprioritize a set of cells on which to camp, including the cells provided by the first base station 602*a* and the second base station 602*b*, based on determining that the NAS procedure is unsuccessful in the first cell provided by the first base station 602*a*.

At 714, the UE may reattempt the NAS procedure in the second cell based on determining that the NAS procedure is unsuccessful in the first cell. For example, the UE may transmit a registration request in the second cell. The UE may refrain from reattempting the NAS procedure in the first cell until at least one of a time period has elapsed or a change to a public land mobile network is detected, and the UE may reattempt the NAS procedure in the second cell during the time period. In the context of FIG. 6, for example, the UE 604 may transmit the registration request 626 in a second cell provided by the second base station 602*b*.

At 716, the UE may receive a registration accept message in the second cell based on the registration request transmitted in the second cell. The NAS procedure may be successfully completed in the second cell based on the registration accept message. In the context of FIG. 6, for example, the UE 604 may receive the registration accept message 628 in the second cell provided by the second base station 602*b* based on the registration request 626 transmitted in the second cell.

Figure 8:
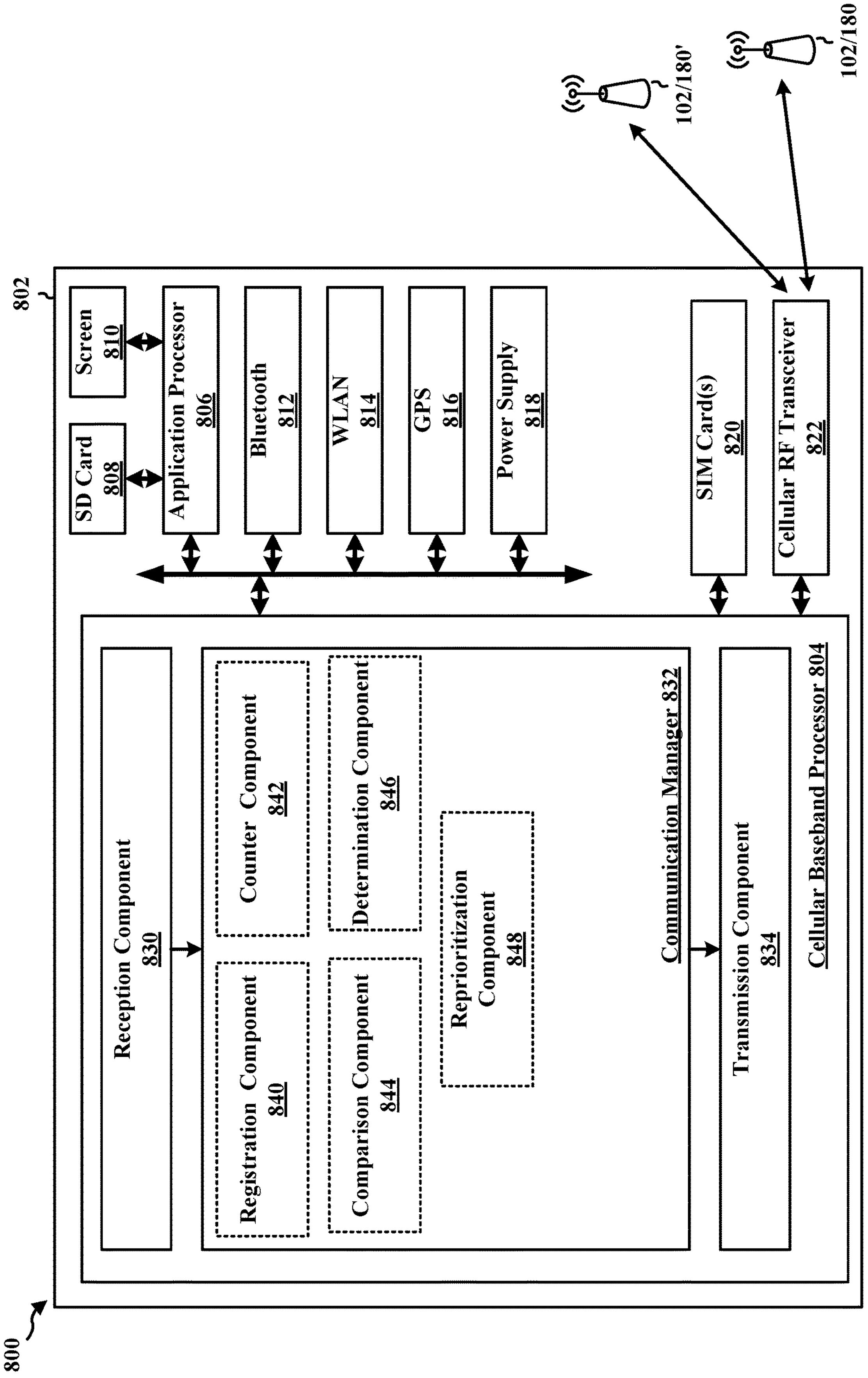
FIG. 8 is a diagram illustrating an example of a hardware implementation for an example apparatus.

FIG. 8 is a diagram 800 illustrating an example of a hardware implementation for an apparatus 802. The apparatus 802 may be a UE or similar device, or the apparatus 802 may be a component of a UE or similar device. The apparatus 802 may include a cellular baseband processor 804 (also referred to as a modem) and/or a cellular RF transceiver 822, which may be coupled together and/or integrated into the same package, component, circuit, chip, and/or other circuitry.

In some aspects, the apparatus 802 may accept or may include one or more subscriber identity modules (SIM) cards 820, which may include one or more integrated circuits, chips, or similar circuitry, and which may be removable or embedded. The one or more SIM cards 820 may carry identification and/or authentication information, such as an international mobile subscriber identity (IMSI) and/or IMSI-related key(s). Further, the apparatus 802 may include one or more of an application processor 806 coupled to a secure digital (SD) card 808 and a screen 810, a Bluetooth module 812, a wireless local area network (WLAN) module 814, a Global Positioning System (GPS) module 816, and/or a power supply 818.

The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804.

In the context of FIG. 4, the cellular baseband processor 804 may be a component of the UE 450 and may include the memory 460 and/or at least one of the TX processor 468, the RX processor 456, and/or the controller/processor 459. In one configuration, the apparatus 802 may be a modem chip and/or may be implemented as the baseband processor 804, while in another configuration, the apparatus 802 may be the entire UE (e.g., the UE 450 of FIG. 4) and may include some or all of the abovementioned components, circuits, chips, and/or other circuitry illustrated in the context of the apparatus 802. In one configuration, the cellular RF transceiver 822 may be implemented as at least one of the transmitter 454TX and/or the receiver 454RX.

The reception component 830 may be configured to receive signaling on a wireless channel, such as signaling from a base station 102/180 or UE 104. The transmission component 834 may be configured to transmit signaling on a wireless channel, such as signaling to a base station 102/180 or UE 104. The communication manager 832 may coordinate or manage some or all wireless communications by the apparatus 802, including across the reception component 830 and the transmission component 834.

The reception component 830 may provide some or all data and/or control information included in received signaling to the communication manager 832, and the communication manager 832 may generate and provide some or all of the data and/or control information to be included in transmitted signaling to the transmission component 834. The communication manager 832 may include the various illustrated components, including one or more components configured to process received data and/or control information, and/or one or more components configured to generate data and/or control information for transmission.

The communication manager 832 may include one or more of a registration component 840, a counter component 842, a comparison component 844, a determination component 846, and/or a reprioritization component 848.

The registration component 840 may be configured to transmit, through the transmission component 834 and in a first cell, a registration request associated with an NAS procedure for UE registration, e.g., as described in connection with 702 of FIG. 7.

The registration component 840 may be configured to receive, through the reception component 830, an RRC message indicating a connection release before the NAS procedure is successfully completed in the first cell, e.g., as described in connection with 704 of FIG. 7.

The counter component 842 may be configured to adjust a value of a counter associated with the first cell based on the RRC message indicating the connection release, e.g., as described in connection with 706 of FIG. 7.

The comparison component 844 may be configured to determine whether the unsuccessful NAS procedure count satisfies (e.g., is greater than or equal to) a threshold, e.g., as described in connection with 708 of FIG. 7. For example, the comparison component 844 may compare the value of a counter that is incremented each time an RRC connection release message is received in response to a registration request with a threshold value.

If the unsuccessful NAS procedure count fails to satisfy (e.g., is less than) the threshold, the determination component 846 may determine to retry the NAS procedure for UE registration in the first cell and may signal the registration component 840 to do so, e.g., as described in connection with 702 of FIG. 7.

If the unsuccessful NAS procedure count satisfies (e.g., is greater than or equal to) the threshold, the determination component 846 may determine that the NAS procedure associated with UE registration is unsuccessful in the first cell, e.g., as described in connection with 710 of FIG. 7.

The reprioritization component 848 may be configured to reprioritize a set of cells on which to camp based on determining that the NAS procedure is unsuccessful in the first cell, e.g., as described in connection with 712 of FIG. 7. In so doing, the reprioritization component 848 may reprioritize the first cell to have a priority that is relatively lower than the priority of a second cell. For example, the reprioritization component 848 may reassign the first cell from a set of preferred cells available for the NAS procedure associated with UE registration to a set of non-preferred cells available for the NAS procedure associated with UE registration; however, the second cell may be included in the set of preferred cells available for the NAS procedure. In some aspects, the first cell and the second cell are associated with at least one of a same registration area, a same tracking area, a same coverage area, or a same ARFCN, and the first cell and the second cell have different PCIs. In some aspects, a first channel metric that is based on measurements in the first cell is greater than a second channel metric that is based on measurements in the second cell.

The registration component 840 may be configured to reattempt the NAS procedure in the second cell based on determining that the NAS procedure is unsuccessful in the first cell, e.g., as described in connection with 714 of FIG. 7. For example, the registration component 840 may transmit, through the transmission component 834, a registration request in the second cell. The registration component 840 may refrain from reattempting the NAS procedure in the first cell until at least one of a time period has elapsed or a change to a public land mobile network is detected, and the registration component 840 may reattempt the NAS procedure in the second cell during the time period.

The registration component 840 may be configured to receive, through the reception component 830, a registration accept message in the second cell based on the registration request transmitted in the second cell, e.g., as described in connection with 716 of FIG. 7. The NAS procedure may be successfully completed in the second cell based on the registration accept message The apparatus 802 may include additional components that perform some or all of the blocks, operations, signaling, etc. of the algorithm(s) in the aforementioned call flow diagram and/or flowchart of FIGS. 6 and/or 7. As such, some or all of the blocks, operations, signaling, etc. in the aforementioned call flow diagram and/or flowchart of FIGS. 6 and/or 7 may be performed by one or more components and the apparatus 802 may include one or more such components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for determining that a NAS procedure associated with UE registration is unsuccessful in a first cell; and means for reattempting the NAS procedure in a second cell based on determining that the NAS procedure is unsuccessful in the first cell.

In one configuration, the apparatus 802, and in particular the cellular baseband processor 804, further includes means for transmitting a registration request associated with the NAS procedure in the first cell; means for receiving an RRC message indicating a connection release before the NAS procedure is successfully completed in the first cell; means for adjusting a value of a counter associated with the first cell based on the RRC message indicating the connection release; and means for comparing the value of the counter with a threshold value, and the NAS procedure is determined to be unsuccessful in the first cell based on comparing the value of the counter with the threshold value.

In one configuration, the apparatus 802, and in particular the cellular baseband processor 804, further includes means for retransmitting the registration request in the first cell after receiving the RRC message indicating the connection release when the value of the counter fails to satisfy the threshold value.

In one configuration, the apparatus 802, and in particular the cellular baseband processor 804, further includes means for reprioritizing a set of cells on which to camp based on determining that the NAS procedure is unsuccessful in the first cell, and the first cell is reprioritized to be below the second cell.

In one configuration, the means for reprioritizing the set of cells on which to camp is configured to: reassign the first cell from a set of preferred cells available for the NAS procedure associated with UE registration to a set of non-preferred cells available for the NAS procedure associated with UE registration, and the second cell is included in the set of preferred cells available for the NAS procedure when reattempting the NAS procedure in the second cell.

In one configuration, the apparatus 802, and in particular the cellular baseband processor 804, further includes means for refraining from reattempting the NAS procedure in the first cell until at least one of a time period has elapsed or a change to a public land mobile network is detected based on the NAS procedure being unsuccessful in the first cell, and the NAS procedure is reattempted in the second cell during the time period.

In one configuration, the first cell and the second cell are associated with at least one of a same registration area, a same tracking area, a same coverage area, or a same ARFCN, and the first cell and the second cell have different PCIs.

In one configuration, a first channel metric that is based on measurements in the first cell is greater than a second channel metric that is based on measurements in the second cell.

In one configuration, the means for reattempting the NAS procedure in the second cell is configured to transmit a registration request in the second cell.

In one configuration, the apparatus 802, and in particular the cellular baseband processor 804, further includes means for receiving a registration accept message in the second cell based on the registration request transmitted in the second cell, and the NAS procedure is successfully completed in the second cell based on the registration accept message.

The aforementioned means may be one or more of the aforementioned components of the apparatus 802 configured to perform the functions recited by the aforementioned means. As described supra, the apparatus 802 may include the TX Processor 468, the RX Processor 456, and the controller/processor 459. As such, in one configuration, the aforementioned means may be the TX Processor 468, the RX Processor 456, and the controller/processor 459 configured to perform the functions recited by the aforementioned means.

The specific order or hierarchy of blocks or operations in each of the foregoing processes, flowcharts, and other diagrams disclosed herein is an illustration of example approaches. Based upon design preferences, the specific order or hierarchy of blocks or operations in each of the processes, flowcharts, and other diagrams may be rearranged, omitted, and/or contemporaneously performed without departing from the scope of the present disclosure. Further, some blocks or operations may be combined or omitted. The accompanying method claims present elements of the various blocks or operations in a sample order, and are not meant to be limited to the specific order or hierarchy presented.

The following examples are illustrative only and may be combined with aspects of other embodiments or teachings described herein, without limitation.

Example 1 is an apparatus implemented at (or as) a UE having a memory and at least one processor coupled to the memory, and the at least one processor is configured to determine that a NAS procedure associated with UE registration is unsuccessful in a first cell; and reattempt the NAS procedure in a second cell based on a determination that the NAS procedure is unsuccessful in the first cell.

Example 12 includes the apparatus of Example 11, and the at least one processor is further configured to: transmit a registration request associated with the NAS procedure in the first cell; receive an RRC message indicating a connection release before the NAS procedure is successfully completed in the first cell; adjust a value of a counter associated with the first cell based on the RRC message indicating the connection release; and compare the value of the counter with a threshold value, and the NAS procedure is determined to be unsuccessful in the first cell based on comparing the value of the counter with the threshold value.

Example 13 includes the apparatus of Example 12, and the at least one processor is further configured to: retransmit the registration request in the first cell after receiving the RRC message indicating the connection release when the value of the counter fails to satisfy the threshold value.

Example 14 includes the apparatus of any of Examples 11 to 13, and the at least one processor is further configured to: reprioritize a set of cells on which to camp based on a determination that the NAS procedure is unsuccessful in the first cell, and the first cell is reprioritized to be below the second cell.

Example 15 includes the apparatus of Example 14, and to reprioritize the set of cells on which to camp includes to: reassign the first cell from a set of preferred cells available for the NAS procedure associated with UE registration to a set of non-preferred cells available for the NAS procedure associated with UE registration, and the second cell is included in the set of preferred cells available for the NAS procedure when reattempting the NAS procedure in the second cell.

Example 16 includes the apparatus of any of Examples 11 to 15, and the at least one processor is further configured to: refrain from reattempting the NAS procedure in the first cell until at least one of a time period has elapsed or a change to a public land mobile network is detected based on the NAS procedure being unsuccessful in the first cell, and the NAS procedure is reattempted in the second cell during the time period.

Example 17 includes the apparatus of any of Examples 11 to 16, and the first cell and the second cell are associated with at least one of a same registration area, a same tracking area, a same coverage area, or a same ARFCN, and the first cell and the second cell have different PCIs.

Example 18 includes the apparatus of any of Examples 11 to 17, and a first channel metric that is based on measurements in the first cell is greater than a second channel metric that is based on measurements in the second cell.

Example 19 includes the apparatus of any of Examples 11 to 18, and to reattempt the NAS procedure in the second cell includes to transmit a registration request in the second cell.

Example 20 includes the apparatus of Example 19, and the at least one processor is further configured to: receive a registration accept message in the second cell based on the registration request transmitted in the second cell, and the NAS procedure is successfully completed in the second cell based on the registration accept message.

The previous description is provided to enable one of ordinary skill in the art to practice the various aspects described herein. Various modifications to these aspects will be readily apparent to those having ordinary skill in the art, and the generic principles defined herein may be applied to other aspects. Thus, the claims are not intended to be limited to the aspects shown herein, but is to be accorded the full scope consistent with the language. Thus, the language employed herein is not intended to limit the scope of the claims to only those aspects shown herein, but is to be accorded the full scope consistent with the language of the claims.

As one example, the language "determining" may encompass a wide variety of actions, and so may not be limited to the concepts and aspects explicitly described or illustrated by the present disclosure. In some contexts, "determining" may include calculating, computing, processing, measuring, deriving, investigating, looking up (e.g., looking up in a table, a database or another data structure), ascertaining, resolving, selecting, choosing, establishing, and so forth. In some other contexts, "determining" may include communication and/or memory operations/procedures through which information or value(s) are acquired, such as "receiving" (e.g., receiving information), "accessing" (e.g., accessing data in a memory), "detecting," and the like.

As another example, reference to an element in the singular is not intended to mean "one and only one" unless specifically stated, but rather "one or more." Further, terms such as "if," "when," and "while" should be interpreted to mean "under the condition that" rather than imply an immediate temporal relationship or reaction. That is, these phrases, e.g., "when," do not imply an immediate action in response to or during the occurrence of an action or event, but rather imply that if a condition is met then another action or event will occur, but without requiring a specific or immediate time constraint or direct correlation for the other action or event to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

determining that a non-access stratum (NAS) procedure associated with UE registration is unsuccessful in a first cell of a network;

reprioritizing a set of cells on which to camp by reassigning the first cell from a set of preferred cells available for the NAS procedure associated with UE registration to a set of non-preferred cells available for the NAS procedure associated with UE registration based on a determination that the NAS procedure is unsuccessful in the first cell, wherein the first cell is reprioritized to be below a second cell; and reattempting the NAS procedure in the second cell of the network based on determining that the NAS procedure is unsuccessful in the first cell, wherein the first cell and the second cell are associated with at least one of a same registration area, or a same absolute radio-frequency channel number ARFCN.

2. The method of claim 1, further comprising:

transmitting a registration request associated with the NAS procedure in the first cell;

receiving a radio resource control (RRC) message indicating a connection release before the NAS procedure is successfully completed in the first cell;

adjusting a value of a counter associated with the first cell based on the RRC message indicating the connection release; and comparing the value of the counter with a threshold value, wherein the NAS procedure is determined to be unsuccessful in the first cell based on comparing the value of the counter with the threshold value.

3. The method of claim 2, further comprising:

retransmitting the registration request in the first cell after receiving the RRC message indicating the connection release when the value of the counter fails to satisfy the threshold value.

4. The method of claim 1, wherein the second cell is included in the set of preferred cells available for the NAS procedure when reattempting the NAS procedure in the second cell.

5. The method of claim 1, further comprising:

refraining from reattempting the NAS procedure in the first cell until at least one of a time period has elapsed or a change to a public land mobile network is detected based on the NAS procedure being unsuccessful in the first cell, wherein the NAS procedure is reattempted in the second cell during the time period.

6. The method of claim 1, wherein the first cell and the second cell have different physical cell identifiers (PCIs).

7. The method of claim 1, wherein a first channel metric that is based on measurements in the first cell is greater than a second channel metric that is based on measurements in the second cell.

8. The method of claim 1, wherein reattempting the NAS procedure in the second cell comprises transmitting a registration request in the second cell.

9. The method of claim 8, further comprising:

receiving a registration accept message in the second cell based on the registration request transmitted in the second cell, wherein the NAS procedure is successfully completed in the second cell based on the registration accept message.

10. An apparatus for wireless communication at a user equipment (UE), comprising:

a memory; and at least one processor coupled to the memory and configured to:

determine that a non-access stratum (NAS) procedure associated with UE registration is unsuccessful in a first cell of a network;

reprioritize a set of cells on which to camp by reassigning the first cell from a set of preferred cells available for the NAS procedure associated with UE registration to a set of non-preferred cells available for the NAS procedure associated with UE registration based on a determination that the NAS procedure is unsuccessful in the first cell, wherein the first cell is reprioritized to be below a second cell; and reattempt the NAS procedure in the second cell of the network based on a determination that the NAS procedure is unsuccessful in the first cell, wherein the first cell and the second cell are associated with at least one of a same registration area, or a same absolute radio-frequency channel number ARFCN.

11. The apparatus of claim 10, wherein the at least one processor is further configured to:

transmit a registration request associated with the NAS procedure in the first cell;

receive a radio resource control (RRC) message indicating a connection release before the NAS procedure is successfully completed in the first cell;

adjust a value of a counter associated with the first cell based on the RRC message indicating the connection release; and compare the value of the counter with a threshold value, wherein the NAS procedure is determined to be unsuccessful in the first cell based on comparing the value of the counter with the threshold value.

12. The apparatus of claim 11, wherein the at least one processor is further configured to:

retransmit the registration request in the first cell after receiving the RRC message indicating the connection release when the value of the counter fails to satisfy the threshold value.

13. The apparatus of claim 10, wherein the second cell is included in the set of preferred cells available for the NAS procedure when reattempting the NAS procedure in the second cell.

14. The apparatus of claim 10, wherein the at least one processor is further configured to:

refrain from reattempting the NAS procedure in the first cell until at least one of a time period has elapsed or a change to a public land mobile network is detected based on the NAS procedure being unsuccessful in the first cell, wherein the NAS procedure is reattempted in the second cell during the time period.

15. The apparatus of claim 10, wherein the first cell and the second cell have different physical cell identifiers (PCIs).

16. The apparatus of claim 10, wherein a first channel metric that is based on measurements in the first cell is greater than a second channel metric that is based on measurements in the second cell.

17. The apparatus of claim 10, wherein to reattempt the NAS procedure in the second cell comprises to transmit a registration request in the second cell.

18. The apparatus of claim 17, wherein the at least one processor is further configured to:

receive a registration accept message in the second cell based on the registration request transmitted in the second cell, wherein the NAS procedure is successfully completed in the second cell based on the registration accept message.

19. An apparatus for wireless communication at a user equipment (UE), comprising:

means for determining that a non-access stratum (NAS) procedure associated with UE registration is unsuccessful in a first cell of a network;

means for reprioritizing a set of cells on which to camp by reassigning the first cell from a set of preferred cells available for the NAS procedure associated with UE registration to a set of non-preferred cells available for the NAS procedure associated with UE registration based on a determination that the NAS procedure is unsuccessful in the first cell, wherein the first cell is reprioritized to be below a second cell; and means for reattempting the NAS procedure in the second cell of the network based on determining that the NAS procedure is unsuccessful in the first cell, wherein the first cell and the second cell are associated with at least one of a same registration area, or a same absolute radio-frequency channel number (ARFCN).

20. The apparatus of claim 19, further comprising:

means for transmitting a registration request associated with the NAS procedure in the first cell;

means for receiving a radio resource control (RRC) message indicating a connection release before the NAS procedure is successfully completed in the first cell;

means for adjusting a value of a counter associated with the first cell based on the RRC message indicating the connection release; and means for comparing the value of the counter with a threshold value, wherein the NAS procedure is determined to be unsuccessful in the first cell based on comparing the value of the counter with the threshold value.

21. The apparatus of claim 20, further comprising:

means for retransmitting the registration request in the first cell after receiving the RRC message indicating the connection release when the value of the counter fails to satisfy the threshold value.

22. The apparatus of claim 19, wherein the second cell is included in the set of preferred cells available for the NAS procedure when reattempting the NAS procedure in the second cell.

23. The apparatus of claim 19, further comprising:

means for refraining from reattempting the NAS procedure in the first cell until at least one of a time period has elapsed or a change to a public land mobile network is detected based on the NAS procedure being unsuccessful in the first cell, wherein the NAS procedure is reattempted in the second cell during the time period.

24. The apparatus of claim 19, wherein the first cell and the second cell have different physical cell identifiers (PCIs).

25. The apparatus of claim 19, wherein a first channel metric that is based on measurements in the first cell is greater than a second channel metric that is based on measurements in the second cell.

26. The apparatus of claim 19, wherein the means for reattempting the NAS procedure in the second cell is configured to transmit a registration request in the second cell.

27. A non-transitory computer-readable medium storing computer-executable code for wireless communication at a user equipment (UE), the code when executed by a processor to cause the processor to:

determine that a non-access stratum (NAS) procedure associated with UE registration is unsuccessful in a first cell of a network;

reprioritize a set of cells on which to camp by reassigning the first cell from a set of preferred cells available for the NAS procedure associated with UE registration to a set of non-preferred cells available for the NAS procedure associated with UE registration based on a determination that the NAS procedure is unsuccessful in the first cell, wherein the first cell is reprioritized to be below a second cell; and reattempt the NAS procedure in the second cell of the network based on a determination that the NAS procedure is unsuccessful in the first cell, wherein the first cell and the second cell are associated with at least one of a same registration area, or a same absolute radio-frequency channel number ARFCN.

* * * * *